US008186216B2

(12) United States Patent
Ogawa et al.

(10) Patent No.: US 8,186,216 B2
(45) Date of Patent: May 29, 2012

(54) DEVICE, SYSTEM, AND METHOD FOR DETERMINING FITTING CONDITION OF CONNECTOR

(75) Inventors: Tatsuya Ogawa, Chiryu (JP); Akira Ishihara, Aichi-ken (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 18 days.

(21) Appl. No.: 12/601,088

(22) PCT Filed: May 20, 2008

(86) PCT No.: PCT/JP2008/059164

§ 371 (c)(1),
(2), (4) Date: May 17, 2010

(87) PCT Pub. No.: WO2008/143226

PCT Pub. Date: Nov. 27, 2008

(65) Prior Publication Data

US 2010/0242599 A1 Sep. 30, 2010

(30) Foreign Application Priority Data

May 24, 2007 (JP) ................................ 2007-138095

(51) Int. Cl.
*G01P 15/00* (2006.01)
*G01M 19/00* (2006.01)

(52) U.S. Cl. ........................................ 73/488; 73/865.8

(58) Field of Classification Search ..................... 73/488
See application file for complete search history.

(56) References Cited

FOREIGN PATENT DOCUMENTS

| | | | |
|---|---|---|---|
| JP | 3-297080 | | 12/1991 |
| JP | 7-185952 | * | 7/1995 |
| JP | 3-297080 | * | 12/1997 |
| JP | 2006-221971 | | 8/2006 |
| JP | 2007-004073 | * | 1/2007 |
| JP | 2007-4073 | | 1/2007 |
| JP | 2008-226506 | | 9/2008 |

* cited by examiner

*Primary Examiner* — Hezron E Williams
*Assistant Examiner* — Gregory J Redmann
(74) *Attorney, Agent, or Firm* — Finnegan, Henderson, Farabow, Garrett & Dunner, LLP

(57) ABSTRACT

Provided are a device, a system, and a method for determining a fitting condition of a connector, which are capable of improving the accuracy for determining the coupling condition of the connector. A connector fitting condition determination device (10) includes an input section (11) that is attached to an operator and receives detection results including sound information and acceleration information that are measured at a time of fitting a connector; a sound information determination section (13) that determines whether the sound information satisfies predetermined conditions based on the detection results input to the input section (11); and an acceleration information determination section (15) that determines whether the acceleration information satisfies predetermined conditions, on detection results satisfying the conditions in the sound information determination section 13. The determination device (10) determines that the connector is fitted, only when both the sound information and the acceleration information satisfy the predetermined conditions.

19 Claims, 15 Drawing Sheets

DEVICE, SYSTEM, AND METHOD FOR DETERMINING FITTING CONDITION OF CONNECTOR

CROSS-REFERENCE TO RELATED APPLICATIONS

This application is a national phase application of International Application No. PCT/JP2008/059164, filed May 20, 2008, and claims the priority of Japanese Application No. 2007-138095, filed May 24, 2007, the contents of both of which are incorporated herein by reference.

TECHNICAL FIELD

The present invention relates to a device, a system, and a method for determining a fitting condition of a connector, which are used for electrical components or the like such as an ECU (Engine Control Unit) and a wire harness mounted in a vehicle.

BACKGROUND ART

With recent advances in computerization of in-vehicle devices, the number of connectors for use in a vehicle is rapidly increasing. A fitting condition of a connector for connecting wires of an electric system of a vehicle is detected by checking the presence or absence of a sound or checking with eyes during a connector fitting operation, or checking a fitting condition by manual operation, for example, for each connector.

However, the connector fitting operation is carried out in a relatively unfavorable acoustical environment and in a narrow space of a vehicle, so it is difficult to reliably perform the checking for every connector. For this reason, it is difficult to secure a sufficient reliability for checking the fitting. Additionally, a certain time is required for the checking, which hinders an improvement in work efficiency.

In this regard, Patent Document 1 discloses a method for checking a fitting condition of a connector for the purpose of easily checking the fitting condition of the connector also in an assembly line. In this method, a vibration detecting section which is attached to an operator detects a vibration produced by a connector at the time of fitting the connector, converts the vibration detected by the vibration detecting section into vibration waveform data, and transmits it. The vibration waveform data is received, and data unnecessary for determining the fitting condition is removed from the vibration waveform data, thereby generating data for determination. The data for determination thus generated is compared with reference data stored in advance, thereby determining whether the fitting condition of the connector is defective or not.

[Patent Document 1] Japanese Unexamined Patent Application Publication No. 2006-221971

DISCLOSURE OF INVENTION

Technical Problem

However, when the determination as to whether the fitting condition of the connector is defective or not is made based on an amount of vibration at the time of coupling, a vibration signal produced during operation other than the connector fitting operation is detected, and a sufficiently high accuracy cannot be obtained. In other words, the method of extracting a sound, analyzing acoustic feature values, and determining the fitting condition of the connector has a problem in that the coupling condition of the connector cannot be checked with accuracy in a workplace in which many similar sounds are produced.

In the workplace, there are many fitting operations other than the connector fitting operation, such as clip fitting. If the determination is made based only on sounds, it is impossible to capture a moment of the connector fitting, and thus an erroneous determination is more likely to be made. Accordingly, when the coupling condition is determined based only on the vibration obtained at the time of fitting a connector, the accuracy thereof becomes extremely low, since there are many similar operations. Moreover, the method disclosed in Patent Document 1 in which a comparison with reference data is made by taking into account a vehicle type, a connector type, and a coupling order, has another problem in that, when operation contents are frequently changed due to an addition of a new vehicle type, an addition of a new connector, or a tact change, the method cannot flexibly deal with these operation contents.

The present invention has been made to solve the above-mentioned problems, and therefore an object of the present invention is to provide a device, a system, and a method for determining a fitting condition of a connector, which are capable of improving the accuracy for determining a coupling condition of a connector.

Technical Solution

A device for determining a fitting condition of a connector according to the present invention includes: input means that is attached to an operator and receives detection results including sound information and acceleration information which are measured at a time of fitting a connector; sound determination means that determines whether the sound information satisfies predetermined conditions, based on the detection results input to the input means; and acceleration determination means that determines whether the acceleration information satisfies predetermined conditions, based on the detection results input to the input means, in which only when both the sound information and the acceleration information satisfy the predetermined conditions, it is determined that the connector is fitted.

According to the present invention, in determining the fitting condition, it is determined that the connector is fitted, only when the predetermined sound conditions are satisfied and the predetermined acceleration conditions are also satisfied, which makes it possible to determine whether the connector is appropriately fitted or not, with extremely high accuracy.

Further, the sound determination means can perform a determination based on at least one of an amount of attenuation of a sound extracted from an amplitude waveform of the sound, the number of peaks indicating an amplitude, and a peak duration for maintaining a peak of a predetermined value or greater. The acceleration determination means can perform a determination based on at least one of a slope of a waveform extracted from an acceleration waveform, a peak timing, and a peak interval. As long as the predetermined sound conditions and acceleration conditions can be determined, various determination conditions can be used.

Furthermore, a trigger timing for the sound information to satisfy the predetermined conditions can be measured, and the acceleration waveform can be determined based on the trigger timing. The slopes or the like of the acceleration waveform can be compared based on the trigger timing.

Moreover, the acceleration determination means can perform an acceleration determination on detection results satisfying the conditions in the sound determination means, thereby preventing a useless acceleration determination from being made.

A system for determining a fitting condition of a connector according to the present invention includes: a detector that is attached to an operator and detects sound information and acceleration information at a time of fitting a connector; and a determination device that receives detection results from the detector and determines the fitting condition of the connector, in which the determination device includes: input means that receives the detection results; sound determination means that determines whether the sound information satisfies predetermined conditions, based on the detection results input to the input means; and acceleration determination means that determines whether the acceleration information satisfies predetermined conditions, based on the detection results input to the input means, and only when it is determined that both the sound information and the acceleration information satisfy the predetermined conditions, it is determined that the connector is fitted.

According to the present invention, based on the detection results from the detector, the determination device determines that the connector is fitted, only when the predetermined sound conditions are satisfied and the predetermined acceleration conditions are also satisfied, which makes it possible to determine whether the connector is appropriately fitted or not, with extremely high accuracy.

Further, the system further includes a receiver that is connected to the determination device by wireless, and the receiver can set conditions for the sound information and the acceleration information to the determination device. The determination is performed by the determination device capable of receiving the detection results via a wire, thereby enabling determination with high accuracy, and the determination results can be displayed, for example, on the receiver.

Moreover, the detector can be attached to a thumb and/or a forefinger of the operator.

A method for determining a fitting condition of a connector according to the present invention includes: a detection step of detecting, by detection means attached to an operator, sound information and acceleration information at a time of fitting a connector; a sound information determination step of determining whether the sound information included in the detection results satisfies predetermined conditions; an acceleration determination step of determining whether the acceleration information included in the detection results satisfies predetermined conditions; and a connector fitting condition determination step of determining that the connecter is fitted, when both the sound information and the acceleration information satisfy the predetermined conditions.

According to the present invention, in determining the fitting condition, it is determined that the connector is fitted, only when the predetermined sound conditions are satisfied and the predetermined acceleration conditions are also satisfied. Thus, when a coupling sound and changes in acceleration are used for determining the coupling of the connector, highly accurate determination results can be obtained.

Further, the acceleration determination step can be carried out only when the predetermined conditions are satisfied in the sound information determination step, thereby preventing a useless determination from being made.

Furthermore, in the acceleration determination step, a predetermined timing extracted from the sound information is set as a trigger timing, and a determination is performed using an acceleration waveform based on the trigger timing. When information about a connector coupling sound is used and changes in acceleration before and after a coupling sound generation time is measured, it is possible to distinguish the connector fitting operation from the other operations, and eliminate the need of taking into account the vehicle type, connector type, coupling order, or the like.

ADVANTAGEOUS EFFECTS

According to the present invention, it is possible to provide a device, a system, and a method for determining a fitting condition of a connector, which are capable of improving the accuracy for determining a coupling condition of a connector.

EXPLANATION OF REFERENCE

Figure 1:
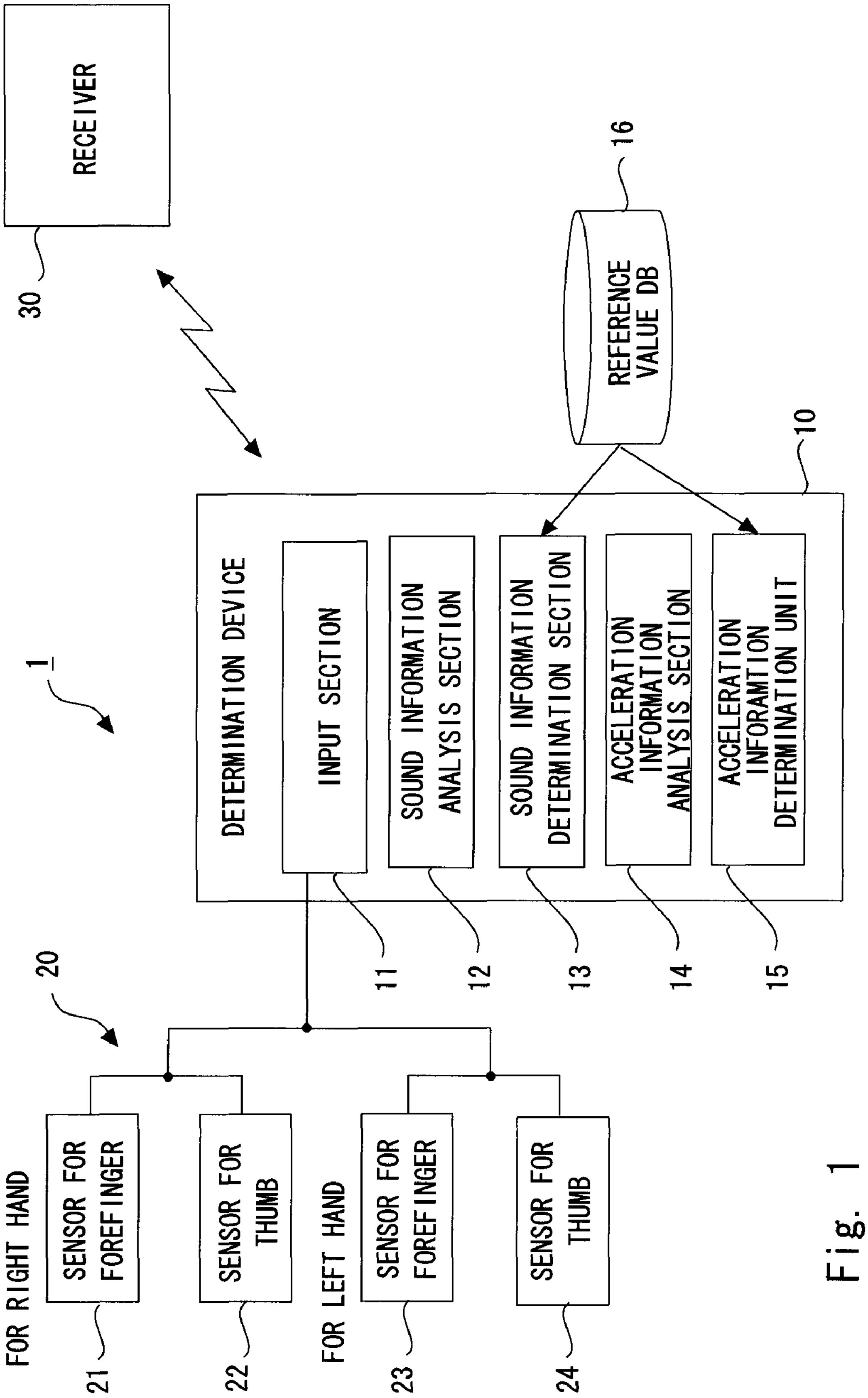
FIG. 1 is a diagram showing a connector fitting determination system according to an embodiment of the present invention.

10 determination device
11 input section
12 sound information analysis section
13 sound information determination section
14 acceleration information analysis section
15 acceleration information determination section
20 detector
21, 23 sensor for forefinger
22, 24 sensor for thumb
30 receiver
40 male connector
41 opening
50 female connector
51 body portion
52 claw portion

BEST MODES FOR CARRYING OUT THE INVENTION

Specific embodiments to which the present invention is applied will be described in detail below with reference to the drawings. FIG. 1 is a diagram showing a connector fitting (connector coupling) determination system according to an embodiment of the present invention. A connector fitting determination system 1 is attached to an operator and includes a detector 20 that detects sound information and acceleration information at the time of fitting the connector, a determination device 10 that receives detection results from the detector 20 to determine the fitting condition of the connector, and a receiver 30 that is connected to the determination device 10 by wireless.

The detector 20 is attached to the thumb and forefinger of the operator, and includes a sensor for the right-hand forefinger 21, a sensor for the right-hand thumb 22, a sensor for the left-hand forefinger 23, and a sensor for the left-hand thumb 24. Note that this embodiment is described with assuming that the measurement is performed with four sensors. Alternatively, the sensors may be attached to only the right hand of a right-handed operator or the like who operates with the right hand, or may be attached to only the left hand of an operator who operates with the left hand. More alternatively, the sensor may be attached to only the thumb or forefinger. Each sensor includes an integrated microphone/acceleration sensor that detects sounds and acceleration. Note that the microphone and acceleration sensor may be separately mounted. The acceleration sensors measure acceleration in six axes in total of the x-axis, y-axis, and z-axis of each of the thumb and forefinger. The detection results obtained by the detector 20 are sent to the determination device 10 which is connected to the detector 20 by a wire.

The determination device 10 includes an input section 11 that receives the detection results, a sound information analysis section 12 that analyzes sound information included in the detection results input to the input section 11, a sound information determination section 13 that determines whether the sound information satisfies predetermined conditions, based on the analysis results of the sound information analysis section 12, an acceleration information analysis section 14 that analyzes acceleration information included in the detection results, and an acceleration information determination section 15 that determines whether or not the analysis results of the acceleration information analysis section 14 satisfy predetermined conditions. Additionally, the determination device 10 is connected to a reference value DB 16 that stores a reference value for determining the sound information and a reference value for determining the acceleration information. The determination device 10 determines that the connector is fitted, only when both the sound information and the acceleration information satisfy the predetermined conditions, and transmits the results to the receiver 30.

The receiver 30 is composed of a PC or the like, and performs wireless communication with the determination device 10. The receiver 30 can also be connected to a line control or the like in a factory to display determination results, and can display or store waveform data of the collected sounds and acceleration information, for example. Further, the receiver 30 reconfigures the conditions for the sound information and acceleration information stored in the reference value DB 16 which is connected to the determination device 10 or included in the determination device 10.

Note that this embodiment is described with assuming that the determination device 10 connected to the detector 20 by a wire determines whether the connector is appropriately fitted or not. Alternatively, the detector 20 may determine whether the connector is appropriately fitted or not. In this case, the detector 20 may transmit the determination results to the receiver 30 by wireless. Thus, instead of determining whether the connector is appropriately fitted or not by transmitting the detected sound information and acceleration information to the receiver 30 capable of wireless data communication, the sound information and acceleration information are determined by the detector 20 or the determination device 10 connected to the detector 20 by a wire, thereby making it possible to make a determination with accuracy. Meanwhile, when satisfactory data can be transmitted by wireless, or when the determination as to whether the connector is appropriately fitted or not can be made using data received by wireless depending on determination conditions or the like, the receiver 30 may determine whether the connector is appropriately fitted or not, as a matter of course.

In this embodiment, the determination as to whether the connector is appropriately fitted or not is made based on results obtained by measuring the motion (acceleration) of the operator's hand during the connector operation, and based on sound signals obtained at the time of fitting a connector. As described above, the determination as to whether the connector is fitted is conventionally made by collecting sounds at the time of fitting a connector or collecting vibrations, and analyzing the feature values. These methods, however, have a difficulty in accurately determining whether the connector is fitted in a workplace where many similar sounds or vibrations are produced. Thus, in this embodiment, the acceleration of an operator's hand is measured during the connector operation, and the analysis results and sound analysis results are determined, thereby improving the determination accuracy.

Figure 2:
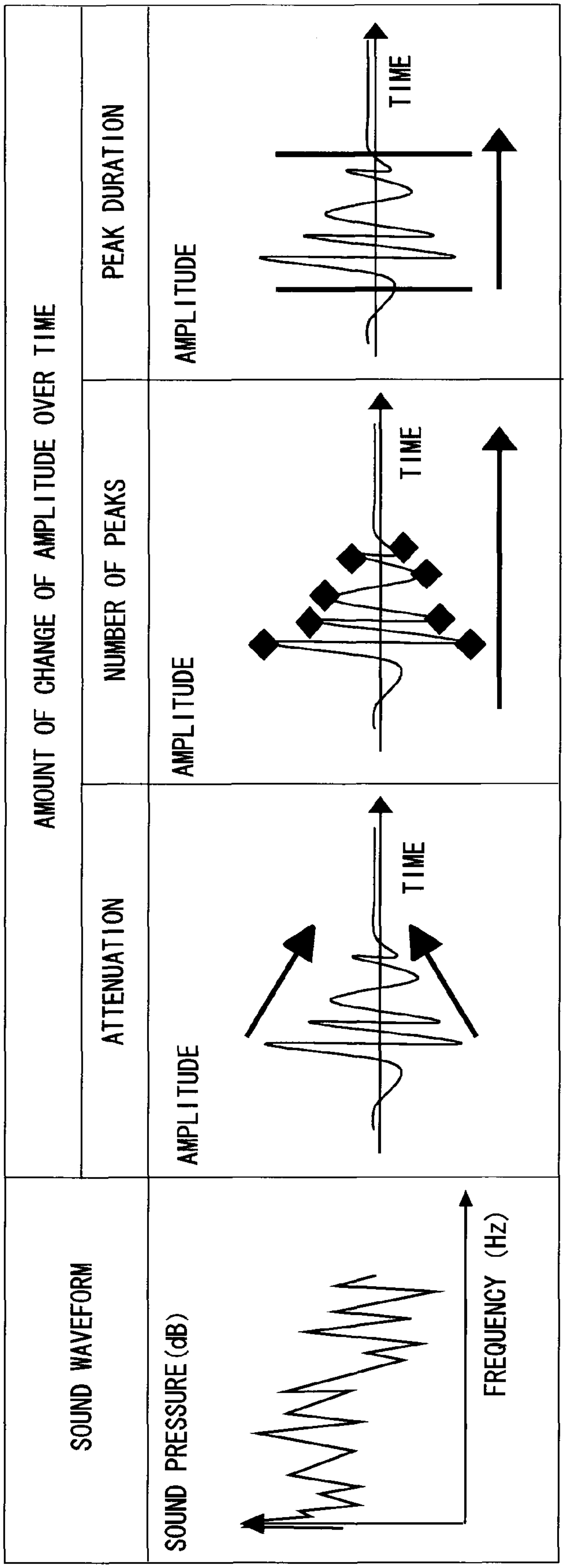
FIG. 2 is a graph showing a sound waveform of a connector fitting sound and an amount of change in the amplitude over time.

First, the sound information analysis section 12 and the sound information determination section 13 will be described. FIG. 2 is a graph showing a sound waveform of a connector fitting sound and an amount of change in the amplitude over time. As shown in FIG. 2, the sound information analysis section 12 extracts an amount of change in the amplitude over time, based on a frequency (Hz) represented by the horizontal axis and a sound waveform of a sound pressure (dB) represented by the longitudinal axis. Then, based on this amount of change in the amplitude over time, it is determined whether the sound waveform corresponds to the connector fitting sound. As shown in FIG. 2, attenuation in amplitude, the number of peaks of an amplitude, a peak duration, and the like are extracted as the amount of change in the amplitude over time. For example, the attenuation may be obtained from a damping width which is obtained after measuring a time period from a peak of a predetermined threshold or larger to a peak of another predetermined threshold or smaller. Further, the number of peaks may be obtained such that a timing at which the amplitude exceeds a predetermined value is set as a trigger timing t1 and the number of peaks included in a predetermined period is determined based on the trigger timing. The peak duration may be a time period in which a peak of vet another predetermined threshold or larger is maintained from the trigger timing t1.

The sound information determination section 13 compares the extracted results with the reference values stored in the reference value DB 16, and determines whether the sound waveform corresponds to the connector fitting sound. Note that the attenuation can also be obtained with being based on the trigger timing t1. That is, the attenuation after the elapse of a predetermined time from the trigger timing t1 may be obtained. Herein, the sound information analysis section 12 and the sound information determination section 13 may use the features based on which the connector fitting sound can be determined, or may use information different from these pieces of information. The reference value DB 16 stores results obtained by measuring features of a connector coupling sound in advance.

Figure 3:
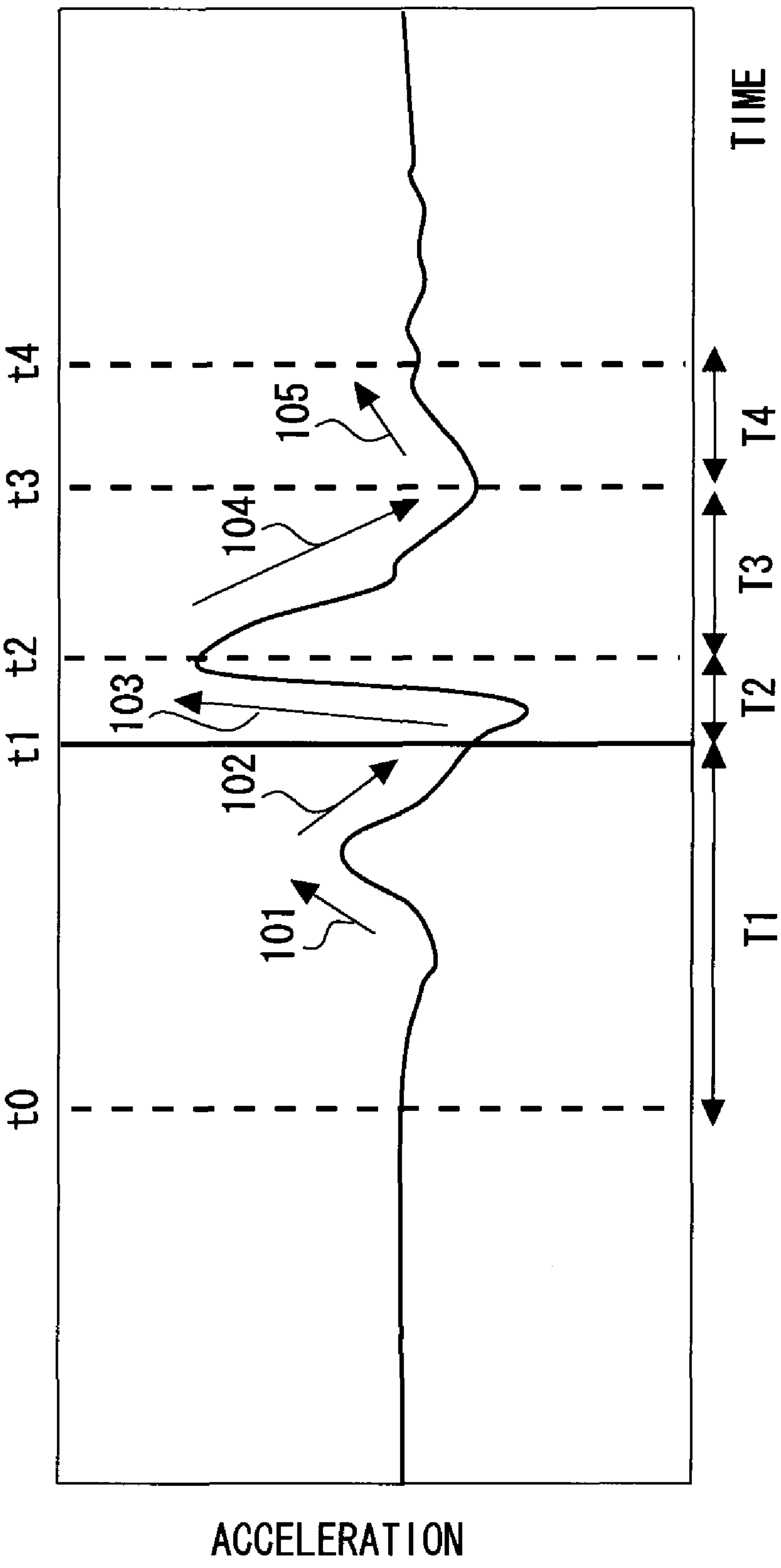
FIG. 3 is a graph showing an acceleration waveform at the time of fitting a connector.
Figure 4:
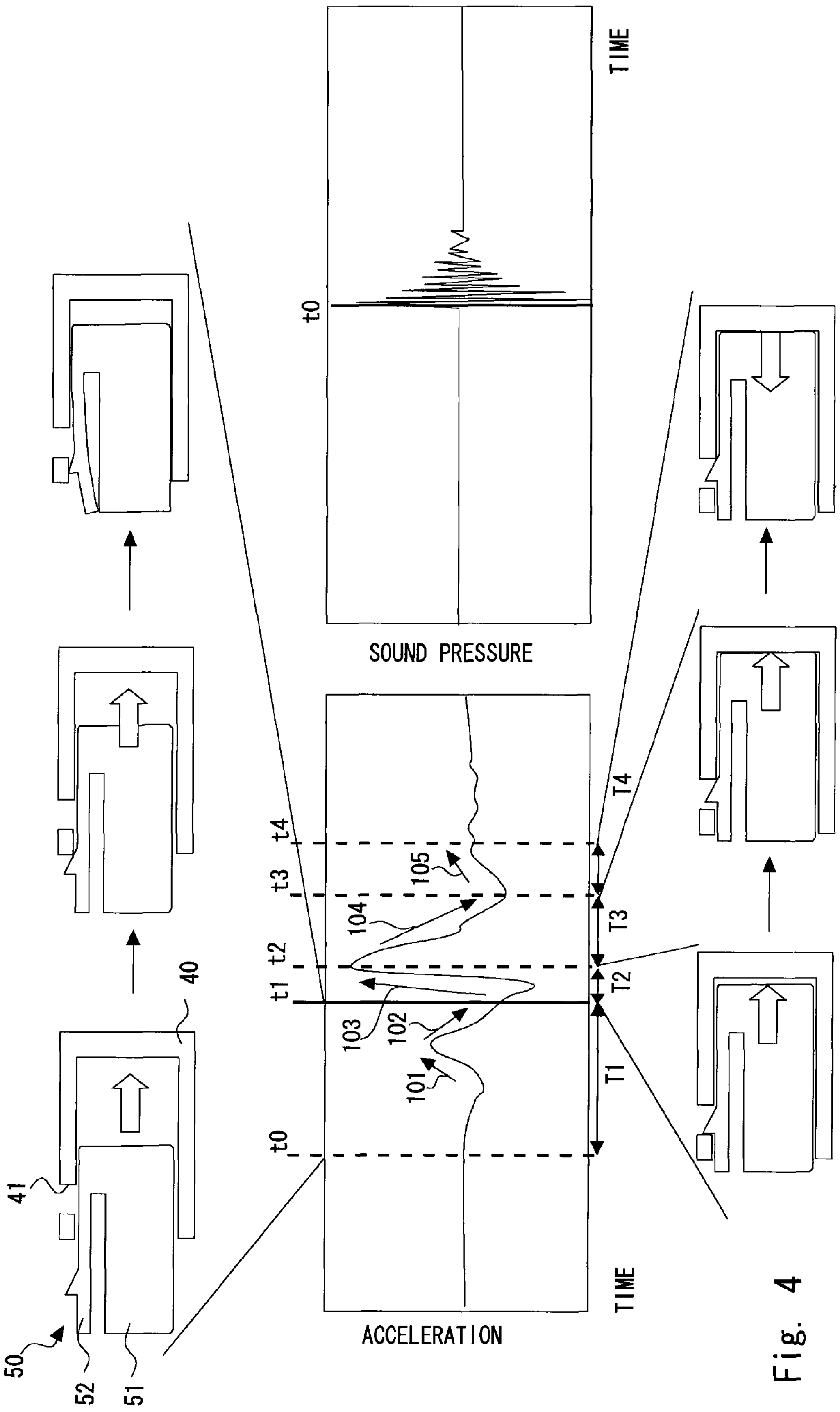
FIG. 4 is an explanatory diagram showing an acceleration waveform at the time of fitting a connector.

Next, the acceleration information analysis section 14 and the acceleration information determination section 15 will be described. FIG. 3 is a graph showing an acceleration waveform at the time of fitting a connector. The horizontal axis represents time, and the longitudinal axis represents acceleration. FIG. 4 is an explanatory diagram showing an acceleration waveform at the time of fitting a connector. Herein, a description is given of an acceleration waveform at the time of fitting a connector having a shape shown in FIG. 4. The connector includes a male connector 40 and a female connector 50. The female connector 50 includes a body portion 51 and a claw portion 52 that is coupled to the body portion 51 and fitted into an opening 41 formed in the male connector 40.

As shown in FIGS. 3 and 4, the acceleration waveform changes from a state T1 to a state T4 based on the fitting condition of the connector. The state T1 (timing t0-t1) indicates a state from when the female connector 50 starts to be inserted into the male connector 40 until the claw portion 52 is fitted into the opening 41 of the male connector 40. First, at the time when insertion of the female connector 50 is started, the acceleration sensor indicates an acceleration 101. Next, when the claw portion 52 of the female connector 50 starts to be brought into contact with the male connector 40 and deformed, the acceleration sensor points to a deceleration direction. Then, when the claw portion 52 of the female connector 50 is inserted while being deformed, the acceleration sensor indicates a deceleration 102.

Then, the claw portion 52 of the female connector 50 is completely fitted into the opening of the male connector 40. At this point, the connector produces a fitting sound, and the amplitude of the sound waveform becomes maximum. The above-mentioned sound information analysis section 12 analyzes this amplitude change, and obtains a fitting sound generation timing as the trigger timing t1. The acceleration information analysis section 14 analyzes the states T1 to T4 based on the trigger timing t1. In the state T2 (timing t1-t2), the acceleration sensor indicates a rapid acceleration 103 immediately after the fitting.

Then, the state shifts to the state T3 (timing t2-t3). The state T3 indicates a state immediately after the body portion 51 of the female connector 50 is brought into contact with the male connector 40. When brought into contact with the side of the male connector 40, the acceleration sensor indicates a rapid deceleration 104.

Then, the state shifts to the state T4 (timing t3-t4). In the state T4, the acceleration sensor indicates an acceleration 105 again under a condition of being applied with a reaction force due to inertia immediately after the body portion 51 of the female connector 50 is brought into contact with the male connector 40.

In this manner, the acceleration waveform at the time of fitting a connector shifts from the state T1 to the state T4. When the fitting sound generation time is set as the trigger timing t1 and the changes of the acceleration waveform in each state are subjected to arithmetic processing based on the trigger timing t1, the determination can be made using the slope, peak time, peak interval, and the like. These pieces of feature information are measured in advance and stored in the reference value DB 16 together with the determination conditions for the sound information described above. The acceleration information determination section 15 reads out the determination conditions from the reference value DB 16, and compares the determination conditions with the detection results, thereby determining whether the acceleration waveform corresponds to the acceleration waveform obtained at the time of fitting a connector.

In this embodiment, the acceleration is determined along six axes in total of the x-axis, y-axis, and z-axis of each of the thumb and forefinger. Further, the determination is made also in the state where the plus and minus are reversed. For example, it can be determined that the connector is fitted, when any one of the six axes satisfies the conditions. Note that the number of waveforms among the six axes that satisfy the conditions for determining that the connector is fitted may be arbitrarily set depending on the conditions for determining whether the connector is fitted and circumstances. In this embodiment, the receiver 30 can set and change these conditions as needed.

Figure 5A:
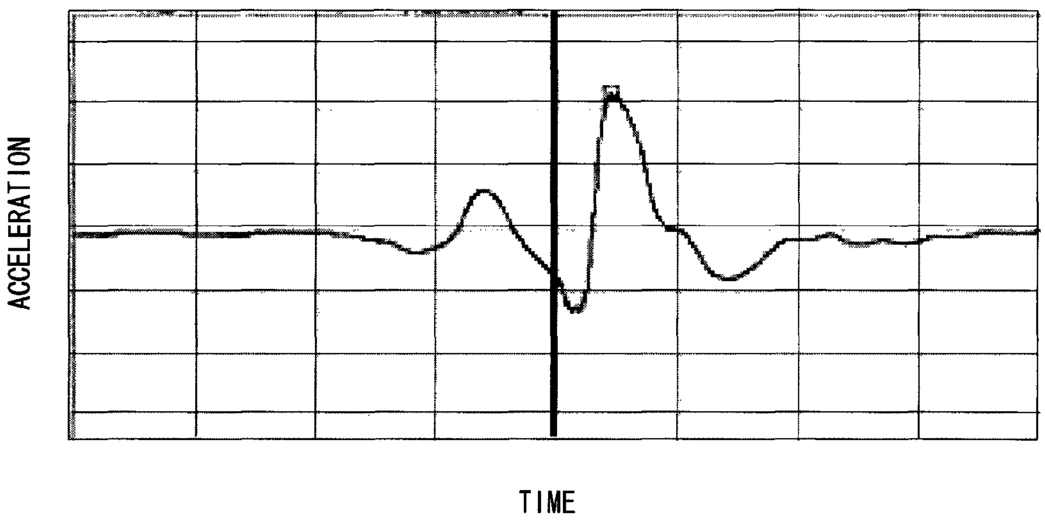
FIG. 5A is a graph showing acceleration in the x-axis direction during fitting of a connector.
Figure 5B:
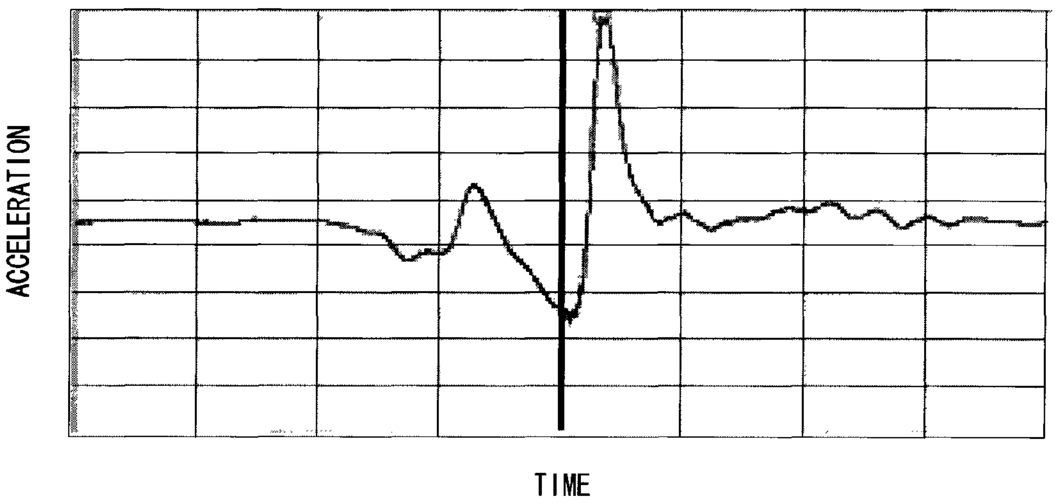
FIG. 5B is a graph showing acceleration in the y-axis direction during fitting of a connector.
Figure 6A:
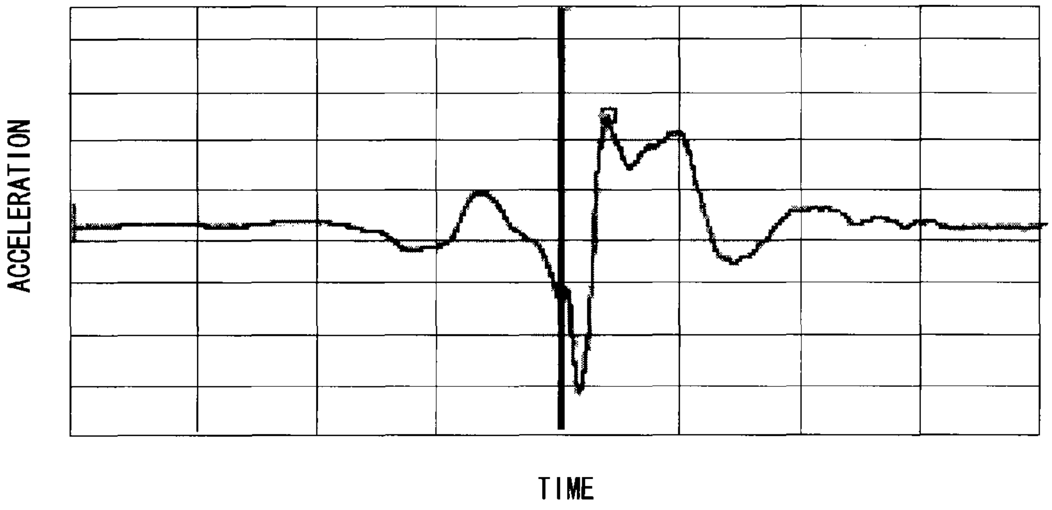
FIG. 6A is a graph showing acceleration in the z-axis direction during fitting of a connector.
Figure 6B:
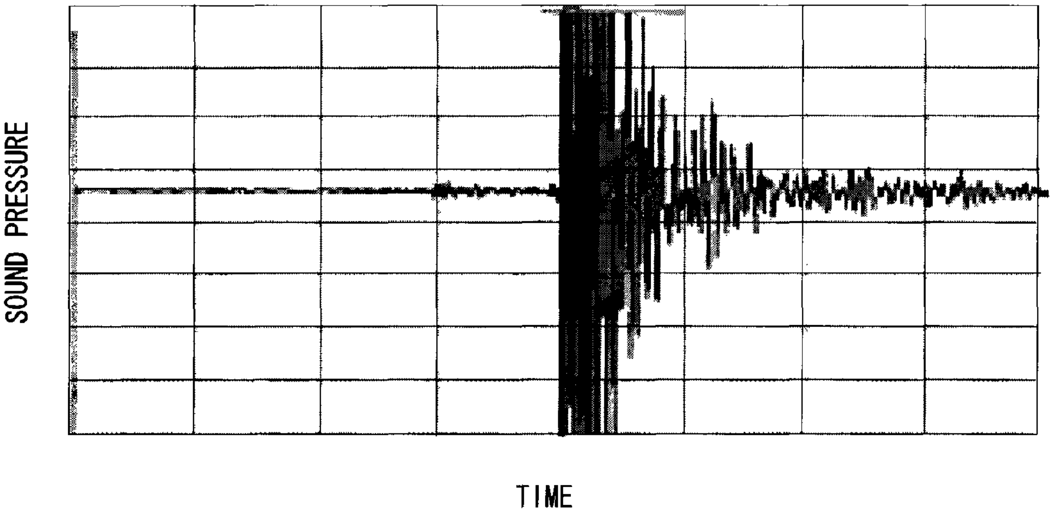
FIG. 6B is a graph showing a sound waveform during fitting of a connector.
Figure 7A:
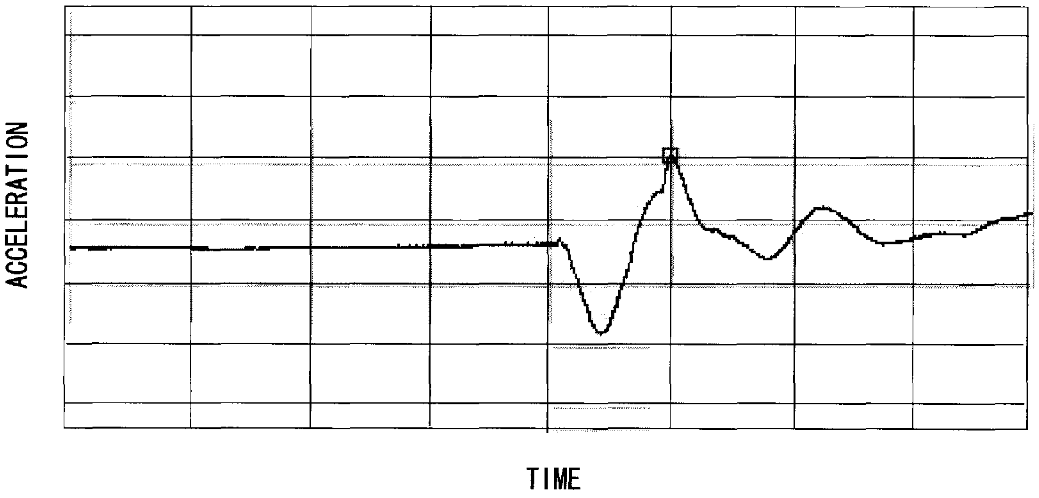
FIG. 7A is a graph showing acceleration in the x-axis direction when a sound is produced by hitting a fastening tool against a holder in the operation in which a sound similar to the connector fitting sound is produced.
Figure 7B:
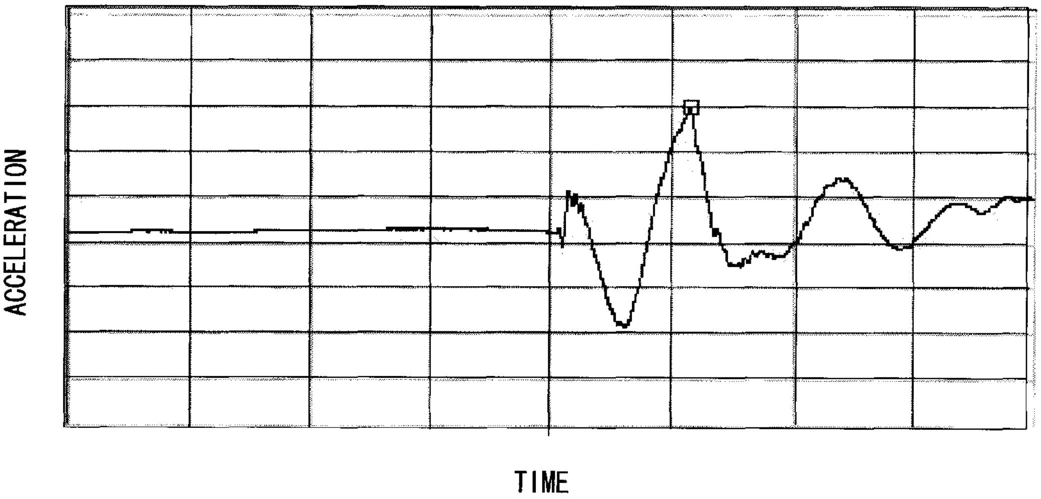
FIG. 7B is a graph showing acceleration in the y-axis direction when a sound is produced by hitting a fastening tool against a holder in the operation in which a sound similar to the connector fitting sound is produced.
Figure 8A:
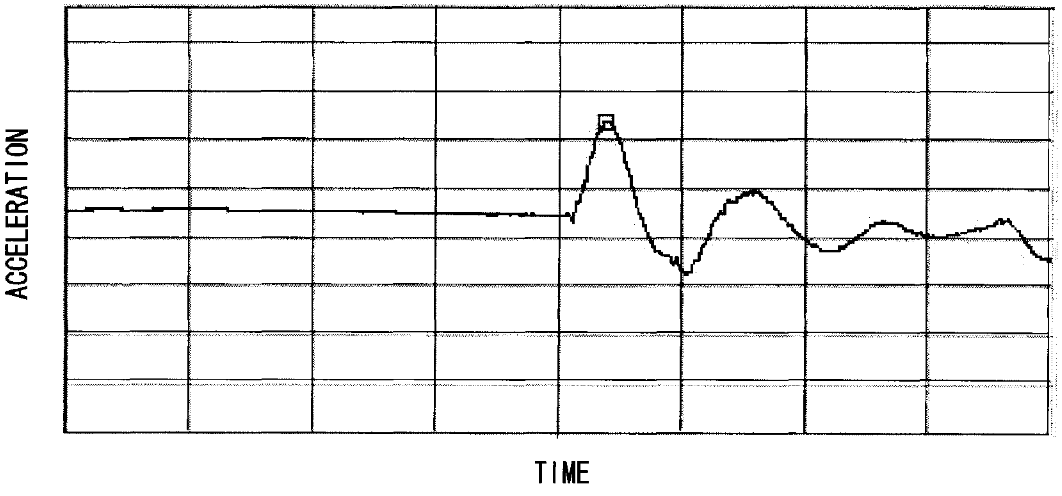
FIG. 8A is a graph showing acceleration in the z-axis direction when a sound is produced by hitting a fastening tool against a holder in the operation in which a sound similar to the connector fitting sound is produced.
Figure 8B:
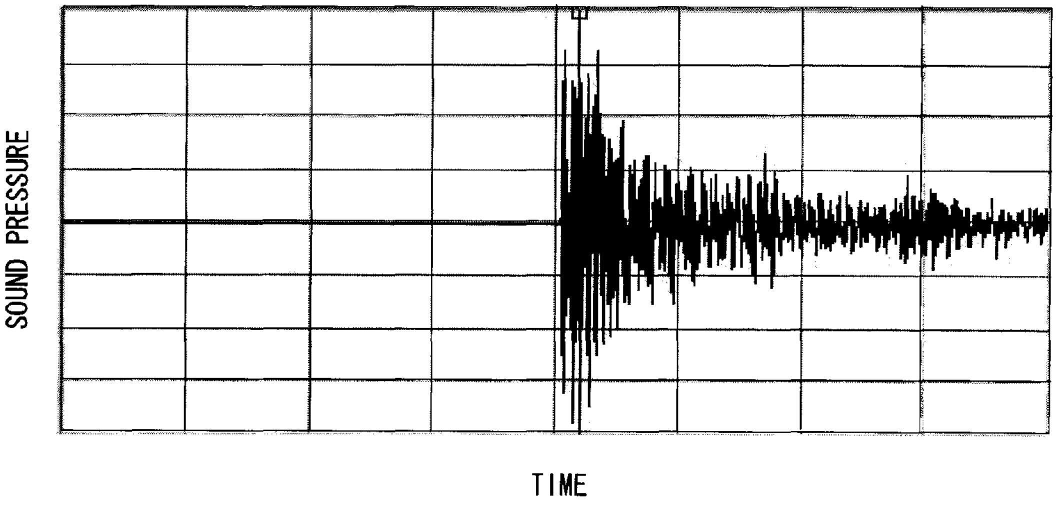
FIG. 8B is a graph showing a sound waveform obtained when a sound is produced by hitting a fastening tool against a holder in the operation in which a sound similar to the connector fitting sound is produced.
Figure 9A:
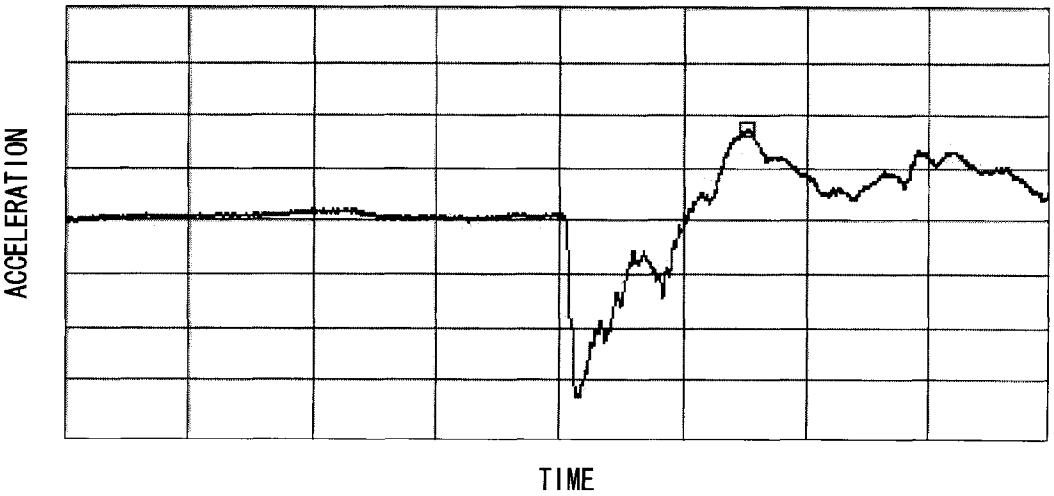
FIG. 9A is a graph showing acceleration in the x-axis direction when a push-button operation sound is produced in the operation in which a sound similar to the connector fitting sound is produced.
Figure 9B:
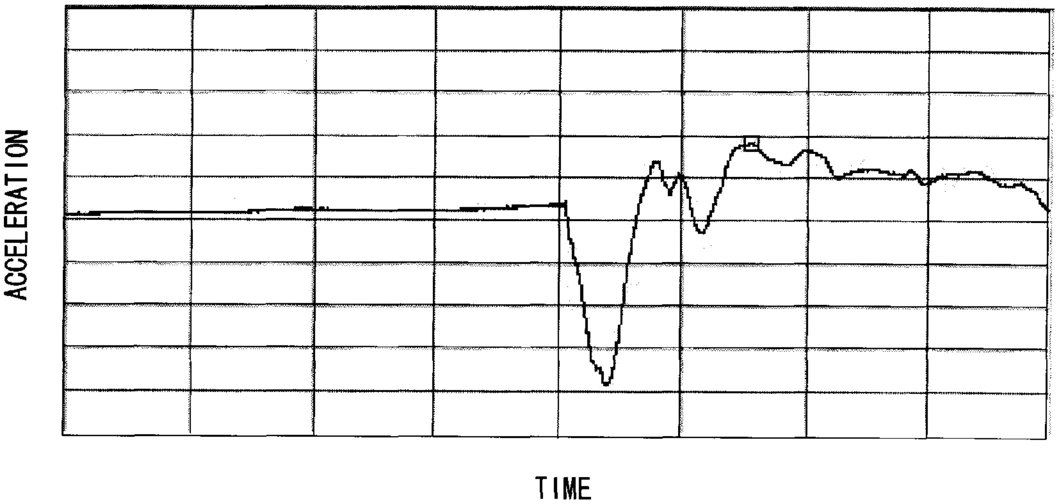
FIG. 9B is a graph showing acceleration in the y-axis direction when the push-button operation sound is produced in the operation in which a sound similar to the connector fitting sound is produced.
Figure 10A:
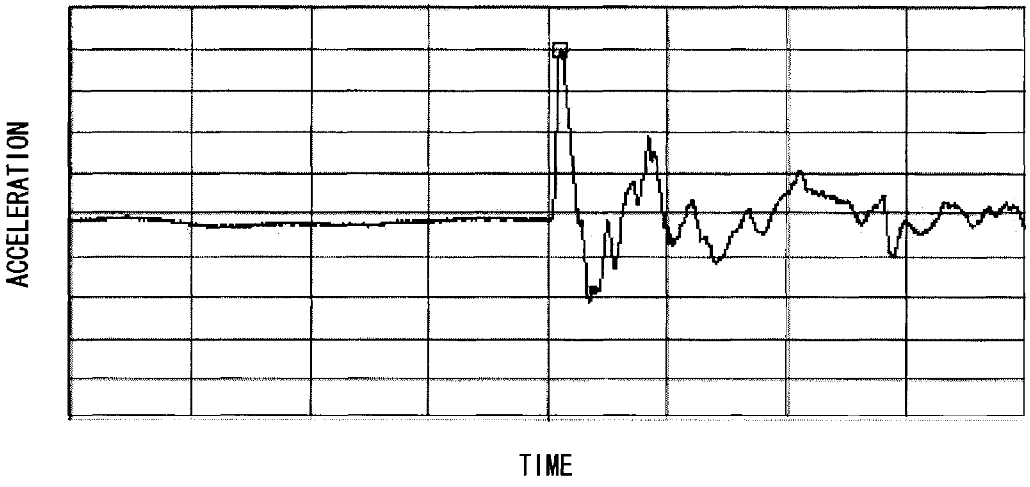
FIG. 10A is a graph showing acceleration in the z-axis direction when the push-button operation sound is produced in the operation in which a sound similar to the connector fitting sound is produced.
Figure 10B:
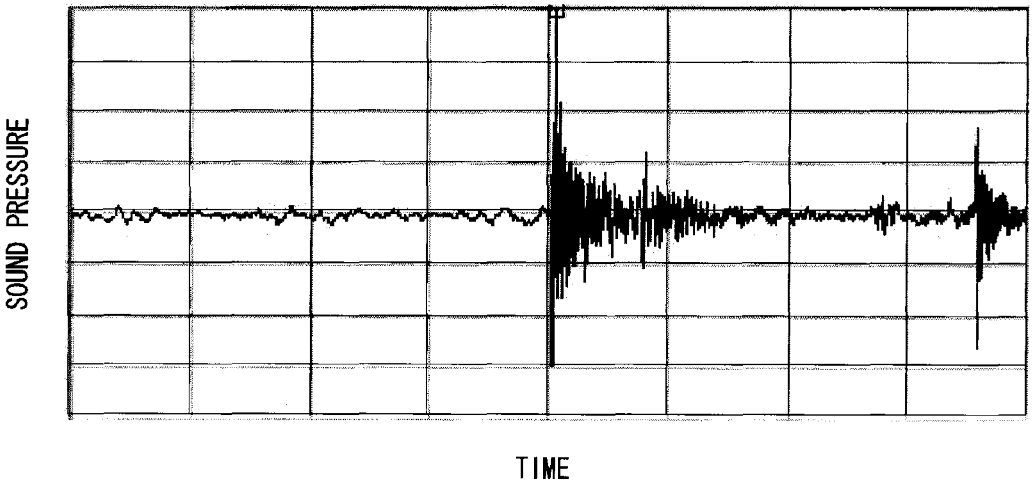
FIG. 10B is a graph showing a sound waveform when the push-button operation sound is produced in the operation in which a sound similar to the connector fitting sound is produced.
Figure 11A:
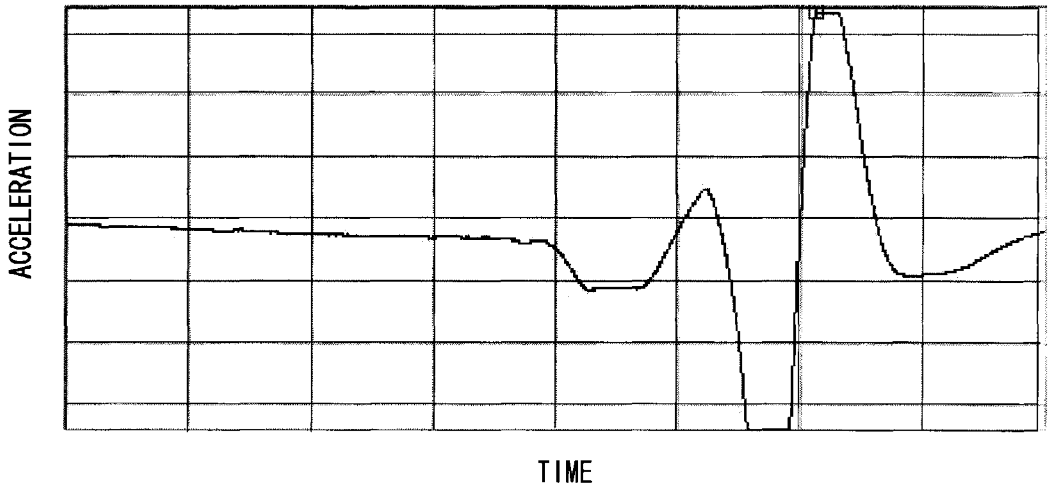
FIG. 11A is a graph showing acceleration in the x-axis direction when a sound is produced in the case where a bolt is set into a socket in the operation in which a sound similar to the connector fitting sound is produced.
Figure 11B:
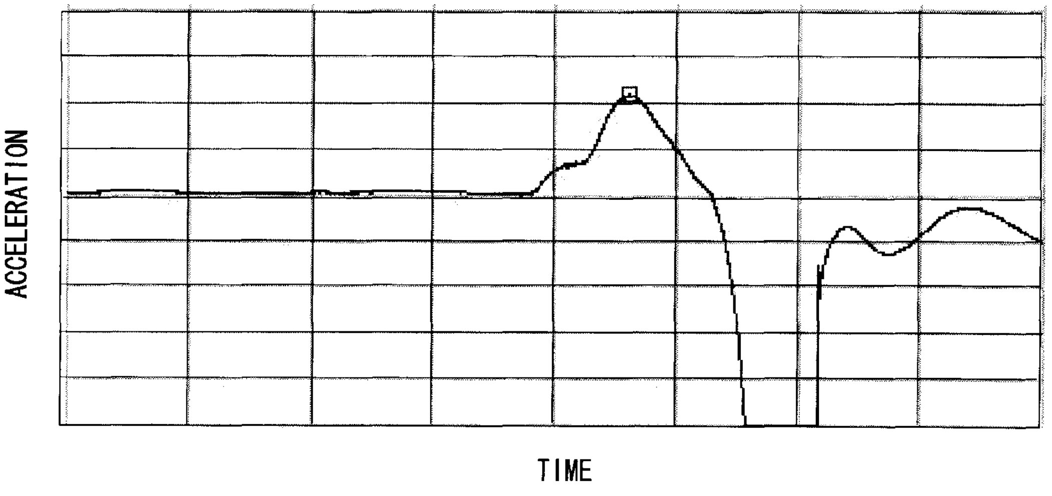
FIG. 11B is a graph showing acceleration in the y-axis direction when a sound is produced in the case where a bolt is set into a socket in the operation in which a sound similar to the connector fitting sound is produced.
Figure 12A:
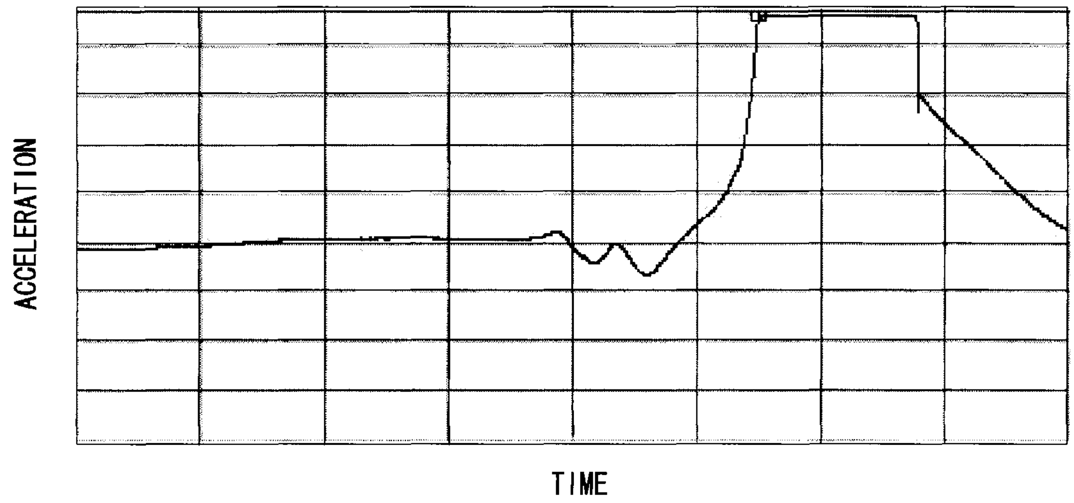
FIG. 12A is a graph showing acceleration in the z-axis direction when a sound is produced in the case where a bolt is set into a socket in the operation in which a sound similar to the connector fitting sound is produced.
Figure 12B:
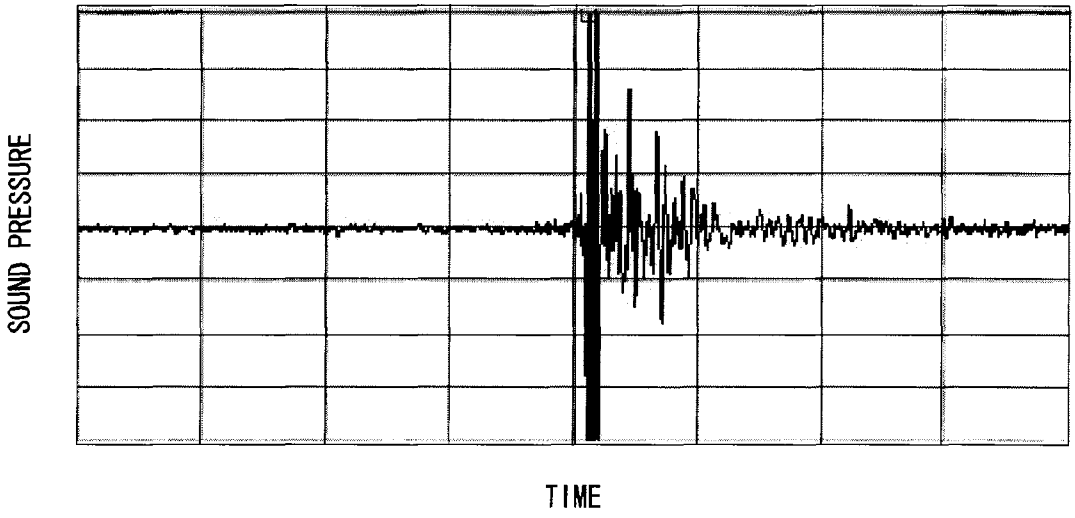
FIG. 12B is a graph showing a sound waveform when a sound is produced in the case where a bolt is set into a socket in the operation in which a sound similar to the connector fitting sound is produced.
Figure 13A:
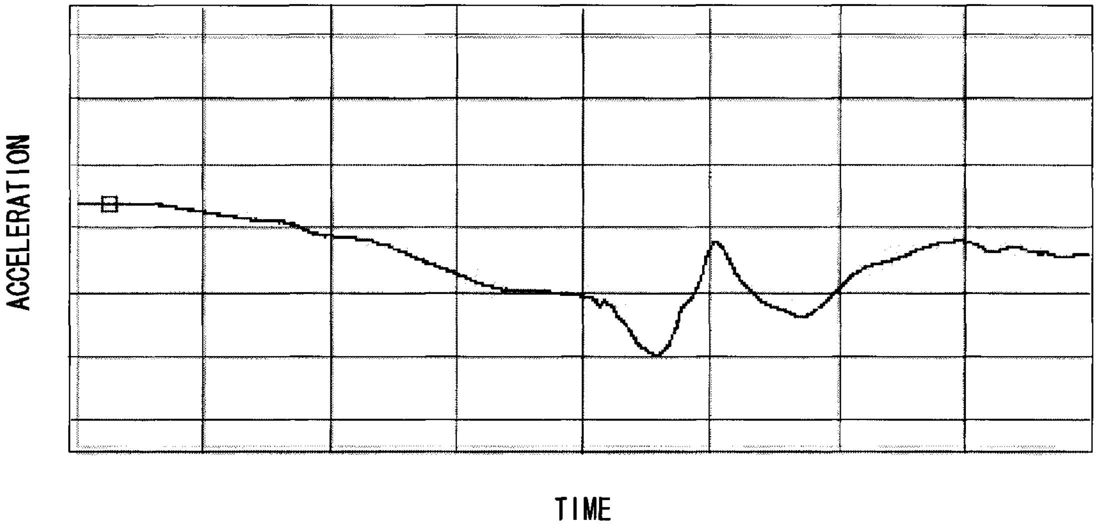
FIG. 13A is a graph showing acceleration in the x-axis direction when a sound is produced in the case where connectors collide with each other in the operation in which a sound similar to the connector fitting sound is produced.
Figure 13B:
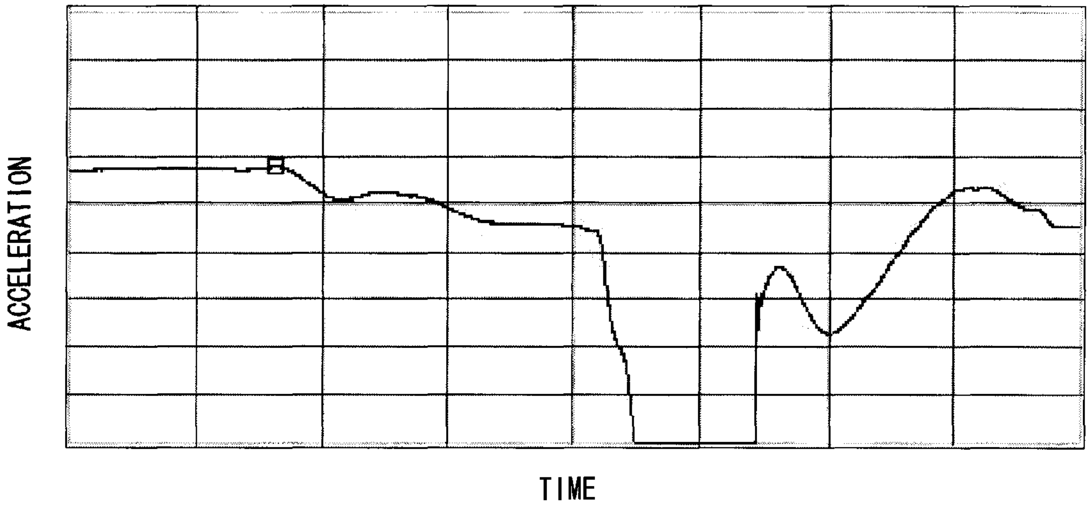
FIG. 13B is a graph showing acceleration in the y-axis direction when a sound is produced in the case where connectors collide with each other in the operation in which a sound similar to the connector fitting sound is produced.
Figure 14A:
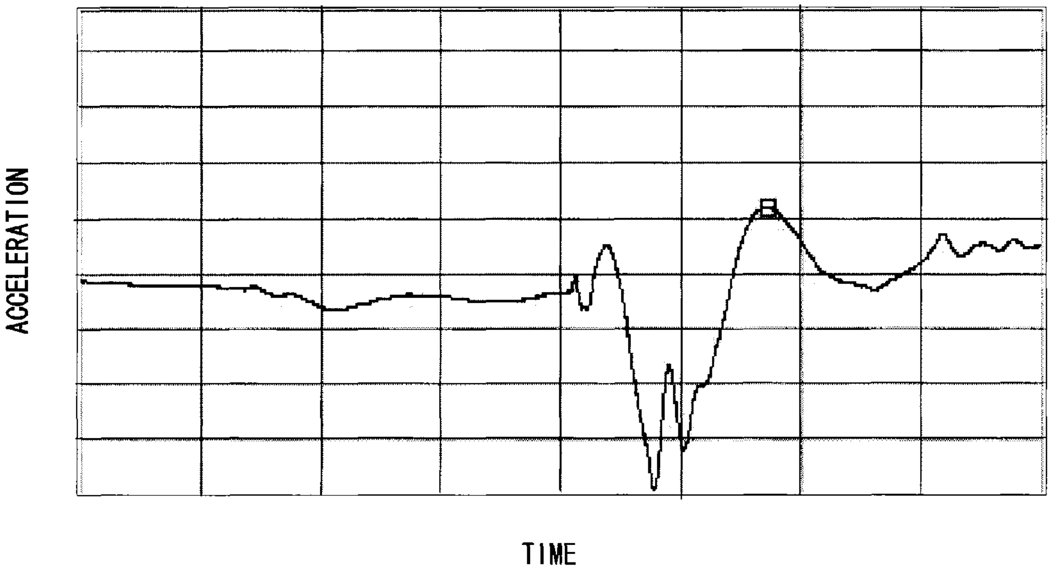
FIG. 14A is a graph showing acceleration in the z-axis direction when a sound is produced in the case where connectors collide with each other in the operation in which a sound similar to the connector fitting sound is produced.
Figure 14B:
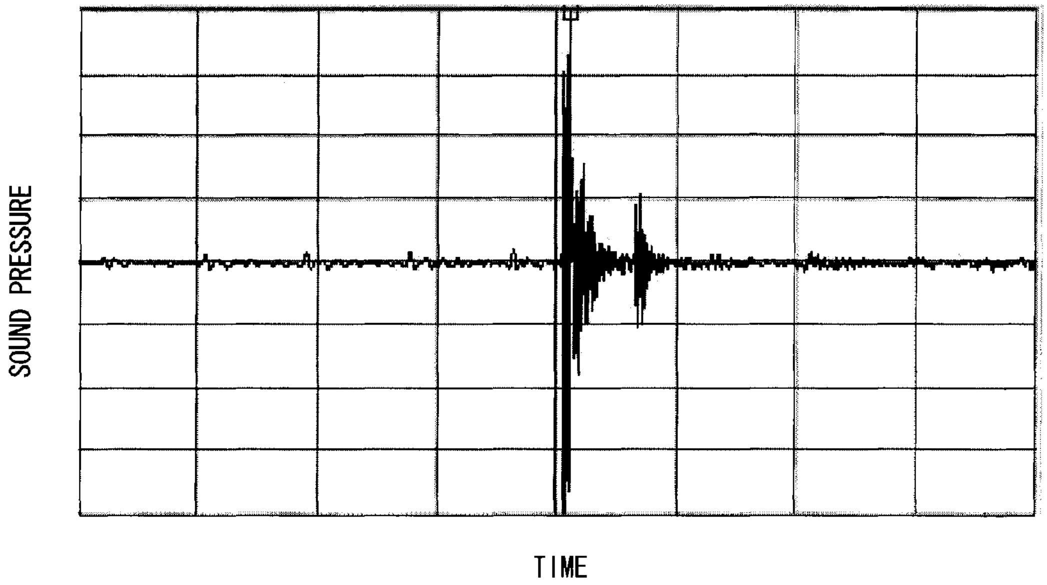
FIG. 14B is a graph showing a sound waveform when a sound is produced in the case where connectors collide with each other in the operation in which a sound similar to the connector fitting sound is produced.

FIGS. 5A to 6B are graphs showing the sound information and acceleration information indicating that the connector is fitted. FIG. 5A shows acceleration in the x-axis direction; FIG. 5B, acceleration in the y-axis direction; FIG. 6A, acceleration in the z-axis direction; and FIG. 6B, a sound waveform. The horizontal axis represents time and the longitudinal axis represents acceleration in FIGS. 5A to 6A, and the horizontal axis represents time and the longitudinal axis represents a sound pressure in FIG. 6B.

FIGS. 7A to 14B, which correspond to these figures, show a sound waveform and an acceleration waveform when a sound is produced in the operation which is different from the connector fitting operation and in which a sound similar to the connector fitting sound is produced. FIGS. 7A to 8B show a sound waveform and an acceleration waveform when a fastening tool is hit against a holder. FIGS. 9A to 10B show a sound waveform and an acceleration waveform when a push-button operation sound is produced. FIGS. 11A to 12B show a sound waveform and an acceleration waveform when a bolt is set into a socket. FIGS. 13A to 14B show a sound waveform and an acceleration waveform when connectors collide with each other.

As shown in FIGS. 6B, 8B, 10B, 12B, and 14B, the sound waveform obtained at the time of fitting a connector is similar to the waveform of other sounds, which makes it difficult to determine that the connector is fitted, based only on the sound waveform. Meanwhile, in the acceleration waveforms shown in FIGS. 5A to 14C other than the above-mentioned figures, a transition from the state T1 to the state T4 is not observed. Thus, through the analysis of the acceleration waveform as well as the sound waveform, the connector fitting can be checked with accuracy. Note that the features of the acceleration waveform at the time of fitting a connector as shown in FIG. 3 appear in any one of the x-axis, y-axis, and z-axis. Accordingly, if these three pieces of information are determined, the connector fitting can be determined.

Figure 15:
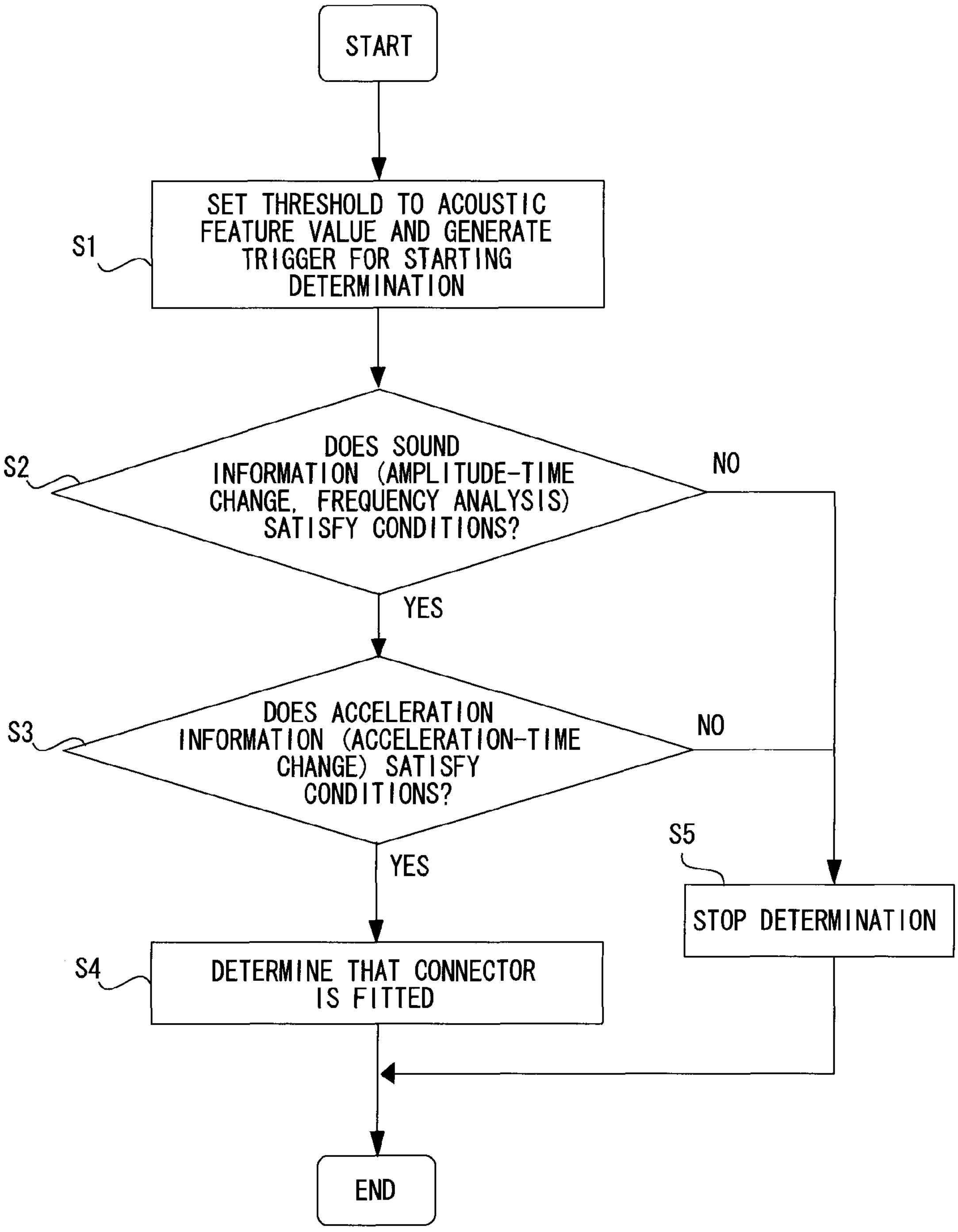
FIG. 15 is a flowchart showing a method for determining a fitting condition of a connector according to an embodiment of the present invention.

FIG. 15 is a flowchart showing a method for determining a fitting condition of a connector according to this embodiment. As shown in FIG. 15, the sound information analysis section 12 first generates the trigger timing (Step S1). The trigger timing may be a timing which exceeds a predetermined threshold that is set to a sound waveform.

Then, the sound waveform is analyzed based on the trigger timing, and the reference values of the reference value DB 16 are compared with various analysis results, thereby determining the sound information (Step S2). In this case, as described above, the attenuation of the amplitude after the elapse of the predetermined time from the trigger timing, the number of peaks of the amplitude included in the predetermined period from the trigger timing, the peak duration for maintaining the amplitude of the predetermined value or larger from the trigger timing, and the like can be used for the determination.

Then, when the conditions are satisfied in the sound information determination section 13, the acceleration determination is carried out (Step S3). Note that when the predetermined conditions are not satisfied in the sound determination, it is determined that the sound does not correspond to the connector fitting sound (Step S5). In the acceleration determination, as described above, the acceleration information analysis section 14 performs arithmetic processing on the changes in waveform from the state T1 to the state T4 for 20 μs before and after the trigger timing, for example, and obtains the slope, peak time, peak interval, and the like, and the acceleration information determination section 15 performs the comparison and determination using the reference values, thereby determining whether the connector is fitted or not.

In this embodiment, sounds and acceleration are measured using a microphone and an accelerometer which are attached to a finger portion of an operator. The motion of the finger is captured during the connector operation, and the connector fitting condition is determined together with the results of analyzing the sound information. Thus, the determination accuracy can be improved. According to the experiments conducted by the present inventors, acceleration waveforms are different from each other even in the operation in which a sound similar to that of a connector is produced, and therefore the connector fitting can be checked with accuracy.

Note that the present invention is not limited to the above-mentioned embodiments, and various modification can be made without departing from the gist of the present invention as a matter of course.

INDUSTRIAL APPLICABILITY

The present invention is applicable to a device, a system, and a method for determining a fitting condition of a connector, which are used for electrical components or the like such as an ECU (Engine Control Unit) and a wire harness mounted in a vehicle.

The invention claimed is:

1. An apparatus for determining a fitting condition of a connector, comprising:

an input unit that receives sound information and acceleration information, the sound information and acceleration information being acquired when the connector is fitted, the sound information including an amplitude waveform of the sound;

a sound determination unit that determines whether at least one of an amount of attenuation of a sound extracted from the amplitude waveform, the number of peaks corresponding to peaks of the amplitude waveform, and a peak duration for maintaining a peak of a predetermined value or greater in the amplitude waveform satisfies a sound predetermined condition; and an acceleration determination unit that determines whether the acceleration information satisfies an acceleration predetermined condition, wherein, when it is determined that both of the sound and acceleration predetermined conditions are satisfied in the sound determination unit and the acceleration determination unit, the apparatus determines that the connector is fitted.

2. The apparatus for determining a fitting condition of a connector according to claim 1, wherein the acceleration information includes an acceleration waveform, and the acceleration determination unit determines whether at least one of a slope of a waveform extracted from the acceleration waveform, a peak timing included in the acceleration waveform, and a peak interval in the acceleration waveform satisfies the acceleration predetermined condition.

3. An apparatus for determining a fitting condition of a connector, comprising:

an input unit that receives sound information and acceleration information, the sound information and acceleration information being acquired when the connector is fitted, the acceleration information including an acceleration waveform;

a sound determination unit that determines whether the sound information satisfies a sound predetermined condition; and an acceleration determination unit that determines whether at least one of a slope of a waveform extracted from the acceleration waveform, a peak timing included in the acceleration waveform, and a peak interval in the acceleration waveform satisfies an acceleration predetermined condition, wherein, when it is determined that both of the sound and acceleration predetermined conditions are satisfied in the sound determination unit and the acceleration determination unit, the apparatus determines that the connector is fitted.

4. The apparatus for determining a fitting condition of a connector according to claim 3, wherein the sound information includes an amplitude waveform of the sound, and the sound determination unit determines whether at least one of an amount of attenuation of a sound extracted from the amplitude waveform, the number of peaks corresponding to peaks of the amplitude waveform, and a peak duration for maintaining a peak of a predetermined value or greater in the amplitude waveform satisfies the sound predetermined condition.

5. The apparatus for determining a fitting condition of a connector according to claim 2, wherein a timing at which a sound is actually produced in a time of being fitted of the connector is detected as a trigger timing based on the amplitude waveform of the sound, and the determination using the acceleration waveform is performed based on the trigger timing.

6. The apparatus for determining a fitting condition of a connector according to claim 1, wherein the acceleration determination unit makes the determination of the acceleration predetermined condition after the sound determination unit determines that the sound predetermined condition is satisfied.

7. The apparatus for determining a fitting condition of a connector according to claim 1, further comprising a detector attached to an operator performing a connector fitting task, wherein the sound information and the acceleration information are acquired based on an output of the detector.

8. The apparatus for determining a fitting condition of a connector according to claim 1, wherein the acceleration information is information based on an output of an acceleration sensor attached to a hand part of an operator performing a connector fitting task, and an output waveform of the acceleration sensor indicates a process of spatial displacement of a connector held by the hand part of the operator during a process of connector fitting.

9. A system for determining a fitting condition of a connector, comprising:

a detector attached to an operator;

a determination apparatus that determines the fitting condition of the connector based on sound information and acceleration information in a time of being fitted of the connector based on an output of the detector; and a receiver that is connected to the determination apparatus by wireless, wherein the determination apparatus comprises:

a sound determination unit that determines whether the sound information satisfies a sound predetermined condition; and an acceleration determination unit that determines whether the acceleration information satisfies an acceleration predetermined condition, the determination apparatus determines that the connector is fitted when it is determined that both of the sound and acceleration predetermined conditions are satisfied in the sound determination unit and the acceleration determination unit, and the receiver sets, for the determination apparatus, each condition used in each determination by the sound determination unit and the acceleration determination unit.

10. The system for determining a fitting condition of a connector according to claim 9, wherein the sound information includes an amplitude waveform of the sound, and the sound determination unit determines whether at least one of an amount of attenuation of a sound extracted from the amplitude waveform, the number of peaks corresponding to peaks of the amplitude waveform, and a peak duration for maintaining a peak of a predetermined value or greater in the amplitude waveform satisfies the sound predetermined condition.

11. The system for determining a fitting condition of a connector according to claim 9, wherein the acceleration information includes an acceleration waveform of the sound, and the acceleration determination unit determines whether at least one of a slope of a waveform extracted from the acceleration waveform, a peak timing included in the acceleration waveform, and a peak interval in the acceleration waveform satisfies the acceleration predetermined condition.

12. The system for determining a fitting condition of a connector according to claim 9, wherein the detector is attached to a thumb and/or a forefinger of the operator.

13. A method for determining a fitting condition of a connector, comprising:

an acquisition of acquiring sound information and acceleration information in a time of being fitted of the connector based on an output of a detection unit attached to an operator, the sound information including an amplitude waveform of the sound;

a sound information determination of determining whether at least one of an amount of attenuation of a sound extracted from the amplitude waveform, the number of peaks corresponding to peaks of the amplitude waveform, and a peak duration for maintaining a peak of a predetermined value or greater in the amplitude waveform satisfies a sound predetermined condition;

an acceleration determination of determining whether the acceleration information satisfies an acceleration predetermined condition; and a connector fitting condition determination of determining that the connector is fitted when it is determined that both of the sound and acceleration predetermined conditions are satisfied in both the sound determination unit and the acceleration determination unit.

14. The method for determining a fitting condition of a connector according to claim 13, wherein the acceleration information includes an acceleration waveform, and in the acceleration determination, it is determined whether at least one of a slope of a waveform extracted from the acceleration waveform, a peak timing included in the acceleration waveform, and a peak interval in the acceleration waveform satisfies the acceleration predetermined condition.

15. A method for determining a fitting condition of a connector, comprising:

an acquisition of acquiring sound information and acceleration information in a time of being fitted of the connector based on an output of a detection unit attached to an operator, the acceleration information including the acceleration waveform;

a sound information determination of determining whether the sound information satisfies a predetermined condition;

an acceleration determination of determining whether at least one of a slope of a waveform extracted from an acceleration waveform, a peak timing included in the acceleration waveform, and a peak interval in the acceleration waveform satisfies an acceleration predetermined condition; and a connector fitting condition determination of determining that the connector is fitted when it is determined that the both of the sound and acceleration predetermined conditions are satisfied in the sound determination and the acceleration determination.

16. The method for determining a fitting condition of a connector according to claim 15, wherein the sound information includes an amplitude waveform of the sound, and in the sound information determination, it is determined whether at least one of an amount of attenuation of a sound extracted from the amplitude waveform, the number of peaks corresponding to peaks of the amplitude waveform, and a peak duration for maintaining a peak of a predetermined value or greater in the amplitude waveform satisfies the sound predetermined condition.

17. The method for determining a fitting condition of a connector according to claim 14, wherein in the acceleration determination, a predetermined timing extracted from the sound information is set as a trigger timing, and a determination is performed using the acceleration waveform based on the trigger timing.

18. The method for determining a fitting condition of a connector according to claim 13, wherein the acceleration determination is carried out after it is determined that the sound predetermined condition is satisfied in the sound information determination.

19. A method for determining a fitting condition of a connector, comprising:

an acquisition of acquiring sound information and acceleration information in a time of being fitted of the connector based on an output of detection unit attached to an operator, the acceleration information including an acceleration waveform;

a sound information determination of determining whether the sound information satisfies a sound predetermined condition;

an acceleration determination of determining the acceleration information satisfies an acceleration predetermined condition; and a connector fitting condition determination of determining that the connector is fitted when it is determined that both of the sound and acceleration predetermined conditions are satisfied in the sound determination unit and the acceleration determination unit, wherein in the acceleration determination, a predetermined timing extracted from the sound information is set as a trigger timing, and a determination is performed using the acceleration waveform based on the trigger timing.

* * * * *